United States Patent
Handa et al.

(10) Patent No.: US 10,393,227 B2
(45) Date of Patent: Aug. 27, 2019

(54) FLAT STRAIN WAVE GEARING

(71) Applicant: Harmonic Drive Systems Inc., Shinagawa-ku, Tokyo (JP)

(72) Inventors: Jun Handa, Azumino (JP); Yoshihide Kiyosawa, Azumino (JP); Noboru Takizawa, Azumino (JP); Xin Yue Zhang, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 439 days.

(21) Appl. No.: 15/500,605

(22) PCT Filed: Aug. 6, 2014

(86) PCT No.: PCT/JP2014/070790
§ 371 (c)(1),
(2) Date: Jan. 31, 2017

(87) PCT Pub. No.: WO2016/021011
PCT Pub. Date: Feb. 11, 2016

(65) Prior Publication Data
US 2017/0219050 A1    Aug. 3, 2017

(51) Int. Cl.
*F16H 49/00* (2006.01)
*F16H 1/32* (2006.01)
(Continued)

(52) U.S. Cl.
CPC ............. *F16H 1/32* (2013.01); *F16H 49/001* (2013.01); *F16H 3/70* (2013.01); *F16H 55/0833* (2013.01);
(Continued)

(58) Field of Classification Search
CPC ........................................................ F16H 49/001
(Continued)

(56) References Cited

U.S. PATENT DOCUMENTS 3,555,929 A * 1/1971 Hossfeld ............... F16H 49/001
74/640
4,545,263 A 10/1985 Fickelscher
(Continued)

FOREIGN PATENT DOCUMENTS

JP   63-63771 B2   12/1988
JP   1-108441 A   4/1989
(Continued)

OTHER PUBLICATIONS

International Search Report (PCT/ISA/210) dated Nov. 11, 2014, by the Japanese Patent Office as the International Searching Authority for International Application No. PCT/JP2014/070790.

*Primary Examiner* — Ha Dinh Ho
(74) *Attorney, Agent, or Firm* — Buchanan Ingersoll & Rooney PC

(57) ABSTRACT

A relieving portion is formed between a first external tooth portion and a second external tooth portion in the external teeth of a flexible externally toothed gear of a flat strain wave gearing. The length L1 of the relieving portion in the tooth trace direction is within the range of 0.1 to 0.5 of the tooth width L of the external teeth. The maximum relieving amount t from the tooth top land of an external tooth in the relieving portion is $3.3 \times 10^{-4} < t/PCD < 6.3 \times 10^{-4}$ where the PCT is defined as the pitch circle diameter of the external teeth. The tooth face load distribution of the external tooth in the tooth trace direction can be equalized, and a flat strain wave gearing having a high transmitted-load capacity can be achieved.

4 Claims, 2 Drawing Sheets

(51) Int. Cl.
   *F16H 3/70*   (2006.01)
   *F16H 57/02*  (2012.01)
   *F16H 55/08*  (2006.01)
(52) U.S. Cl.
   CPC ........ *F16H 57/02* (2013.01); *F16H 2049/003* (2013.01)
(58) Field of Classification Search
   USPC .......................................................... 74/640
   See application file for complete search history.

(56) References Cited

U.S. PATENT DOCUMENTS

| | | | |
|---|---|---|---|
| 4,601,216 A | | 7/1986 | Inoue et al. |
| 4,974,470 A | * | 12/1990 | Ishikawa ............... F16H 49/001 74/640 |
| 8,485,064 B2 | * | 7/2013 | Kanai ................... F16H 49/001 74/640 |
| 9,157,517 B2 | * | 10/2015 | Lunin ................... F16H 49/001 |
| 9,360,098 B2 | * | 6/2016 | Roopnarine .......... F16H 49/001 |

FOREIGN PATENT DOCUMENTS

| | | |
|---|---|---|
| JP | 1-91151 U | 6/1989 |
| JP | 2-275147 A | 11/1990 |
| WO | WO 84/00056 A1 | 1/1984 |

* cited by examiner

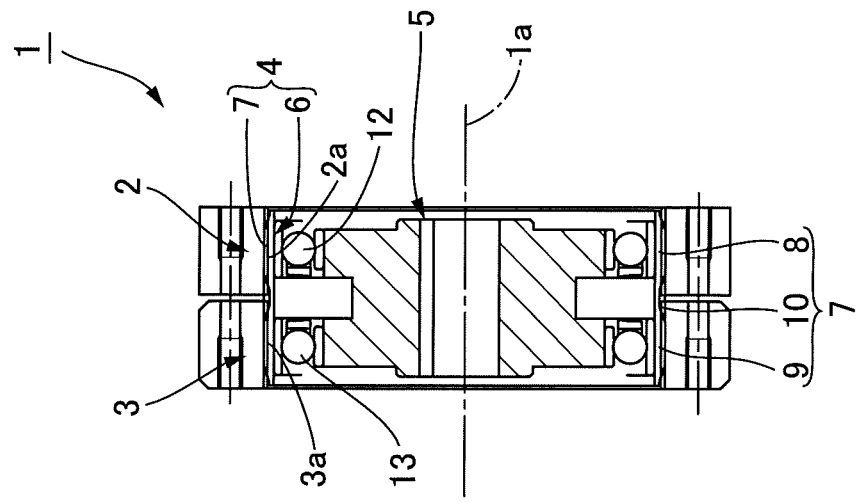
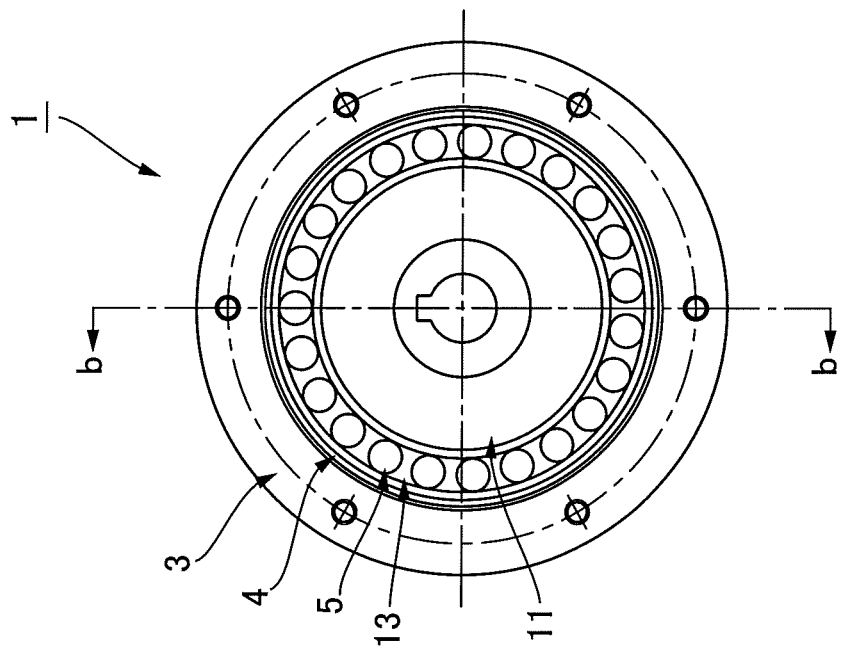
FIG. 1(a)
FIG. 1(b)

FLAT STRAIN WAVE GEARING

TECHNICAL FIELD

The present invention relates to a flat strain wave gearing provided with a pair of rigid internally toothed gears, a cylindrically shaped flexible externally toothed gear, and a wave generator.

ART

In a flat strain wave gearing, one first rigid internally toothed gear has more teeth than a flexible externally toothed gear, and another second rigid internally toothed gear has the same number of teeth as the flexible externally toothed gear. The flexible externally toothed gear, made to flex into a non-circular shape, e.g., an ellipsoidal shape by the wave generator, partially meshes with both the first and second rigid internally toothed gears.

When the wave generator is caused to rotate by a motor or the like, the location of the meshing between the first rigid internally toothed gear and the flexible externally toothed gear, which have different numbers of teeth, moves in a circumferential direction. When the first rigid internally toothed gear is fixed so as to not rotate, the flexible externally toothed gear rotates relative to the first rigid internally toothed gear, by an amount proportionate to the difference in the number of teeth, while the wave generator makes one rotation. The other second rigid internally toothed gear, which is supported so as to be free to rotate, rotates integrally with the flexible externally toothed gear. Consequently, the difference in the number of teeth between the first rigid internally toothed gear and the flexible externally toothed gear results in the inputted rotation (the rotation of the wave generator) being reduced at a predetermined reduction ratio, and reduced rotation being outputted from the second rigid internally toothed gear.

Patent Documents 1 and 2 each disclose a flat strain wave gearing having a wave generator provided with two rows of ball bearings. This type of wave generator is configured from a rigid plug having an ellipsoidally contoured external peripheral surface, and two rows of ball bearings fitted on the external peripheral surface. The flexible externally toothed gear is pushed radially outward by the portions at the major-axis ends of the ellipsoidally flexed external peripheral surface of the outer race for the ball bearings, and the meshing of the flexible externally toothed gear with the first and second rigid internally toothed gears is held.

In a flat strain wave gearing having a wave generator provided with two rows of ball bearings, the two rows of ball bearings are disposed near the centers of the external teeth in the tooth trace direction, and the distance between ball centers is no more than ⅓ of total tooth width of each external tooth.

PRIOR ART DOCUMENTS

Patent Documents

Patent Document 1: JPU 01-91151 A
Patent Document 2: JP 02-275147 A

DISCLOSURE OF THE INVENTION

Problems to be Solved by the Invention

One portion of the flexible externally toothed gear in the tooth trace direction thereof meshes with the first rigid internally toothed gear, while another portion meshes with the second rigid internally toothed gear. Therefore, load torque causes different amounts of force to be exerted on the two portions of the flexible externally toothed gear in the tooth trace direction by the first and second rigid internally toothed gears, creating torsion. Therefore, the tooth contact state changes depending on the position in the tooth trace direction, and the tooth face load changes depending on where it is exerted in the tooth trace direction.

The state of the meshing between the first and second rigid internally toothed gears and the flexible externally toothed gear, which is made of a thin-walled elastic body, and particularly the state of meshing in the tooth trace direction between these gears, is affected by the supporting rigidity of the wave generator. When the state of meshing is not appropriate at individual positions in the tooth trace direction, the transmitted-load capacity of the strain wave gearing decreases.

To increase the root fatigue strength of the flexible externally toothed gear and improve the transmitted-load capacity, the tooth face load distribution in the tooth trace direction must be evened out, and the maximum tooth face load must be reduced. The supporting rigidity of the wave generator must also be increased so that an appropriate state of meshing is achieved at all positions in the tooth trace direction.

Furthermore, when the manner in which the flexible externally toothed gear is supported by the wave generator is not appropriate, the bearing ball load distribution greatly changes in the two rows of ball bearings, and the life span of the ball bearings decreases.

With the foregoing in view, it is an object of the present invention to provide a flat strain wave gearing in which the tooth face load distribution of the flexible externally toothed gear in the tooth trace direction can be evened out, and a satisfactory state of meshing can be achieved at any position in the tooth trace direction, in order to improve the root fatigue strength of the flexible externally toothed gear and the transmitted-load capacity of the gearing.

Another object of the present invention is to provide a flat strain wave gearing in which the bearing ball load distribution in the two rows of ball bearings can be evened out in order to extend the life span of the wave generator.

Means of Solving the Problems

To solve the problems described above, a flat strain wave gearing of the present invention is characterized by comprising:

a first rigid internally toothed gear provided with first internal teeth having a first number of teeth;

a second rigid internally toothed gear disposed adjacent to and coaxially with the first rigid internally toothed gear, and provided with second internal teeth having a second number of teeth different from the first number of teeth;

a cylindrical, flexible externally toothed gear which is disposed coaxially with the inner sides of the first and second rigid internally toothed gears, which is provided with external teeth capable of meshing with the first internal teeth and the second internal teeth, and which is capable of flexing in a radial direction; and a wave generator which is disposed on the inner side of the flexible externally toothed gear, and which makes the flexible externally toothed gear flex into a non-circular shape, causing the external teeth to partially mesh with the first and second internal teeth;

the external teeth being divided into a first external tooth portion that faces the first internal teeth, and a second external tooth portion that faces the second internal teeth, by a relieving portion which is formed in a portion of the external teeth located in the center along a tooth trace direction of the external teeth, and which is formed through a predetermined length in the tooth trace direction;

the relieving portion being subjected to relieving so that tooth depth is lowest in the tooth-trace-direction center of the relieving portion;

the wave generator being provided with a first wave bearing for supporting the first external tooth portion and a second wave bearing for supporting the second external tooth portion;

the relieving length L1 of the relieving portion in the tooth trace direction satisfying the conditional expression $$0.1L<L1<0.5L$$

where L is the total tooth width of the external teeth; and the maximum relieving amount t in a tooth depth direction from a top land of an external tooth in the relieving portion satisfying the conditional expression $$3.3\times10^{-4}<t/PCD<6.3\times10^{-4}$$

where PCD is the pitch circle diameter of the external teeth.

In the flat strain wave gearing of the present invention, the relieving portion is formed between the first external tooth portion and the second external tooth portion in the external teeth of the flexible externally toothed gear. Because the relieving shape of the relieving portion (the relieving length L1 in the tooth trace direction and the maximum relieving amount t in the tooth depth direction) is appropriately set, torsion of the external teeth in the tooth trace direction can be prevented or suppressed. Consequently, a satisfactory state of meshing can be achieved between the external teeth and the first and second internal teeth in individual tooth-trace-direction locations on the external teeth, and the tooth face load distribution on the external teeth in the tooth trace direction can be evened out. The root fatigue strength of the flexible externally toothed gear can thereby be increased, and the transmitted-load capacity of the flat strain wave gearing can be increased.

Next, in the flat strain wave gearing of the present invention, with Lo defined as the distance between support centers of the first and second wave bearings, the distance Lo between the support centers preferably increases and decreases as the relieving length L1 increases and decreases. The support centers of the first and second wave bearings can thereby be brought closer to the meshing centers between the first external tooth portion and the first internal teeth and the meshing centers between the second external tooth portion and the second internal teeth, and the rigidity with which the wave generator supports the external teeth can be increased.

In this case, the distance Lo between the support centers is preferably greater than 0.35L, so that the support centers of the first and second wave bearings will not be greatly misaligned inwardly in the tooth trace direction from the meshing centers on the sides of the first and second external tooth portions. Moreover, the distance Lo between the support centers is preferably less than 0.7L so that the outer races of the first and second wave bearings remain within the tooth width of the external teeth in the tooth trace direction. Specifically, the distance Lo between the support centers preferably satisfies the following conditional expression:

$$0.35L<Lo<0.7L$$

The first external tooth portion is supported by the first wave bearing, the second external tooth portion is supported by the second wave bearing, and the relieving portion is positioned between the support centers of the first and second wave bearings, along the tooth trace direction of the external teeth. The relieving length L1 of the relieving portion of the external teeth preferably satisfies the following conditional expression, in relation to the distance Lo between the support centers of the first and second wave bearings.

$$0.3Lo<L1<0.7Lo$$

The meshing center on the side of the first external tooth portion can thereby be prevented from greatly shifting in the tooth trace direction away from the support center of the first wave bearing, and the meshing center on the side of the second external tooth portion can be prevented from greatly shifting in the tooth trace direction away from the support center of the second wave bearing.

The first and second rigid internally toothed gears mesh with the first and second external tooth portions, of which the tooth widths increase and decrease in accordance with the relieving length. Therefore, the tooth widths of the first and second rigid internally toothed gears also preferably increase and decrease in accordance with the relieving length.

Specifically, with the tooth width L2 defined as the tooth widths of the first and second rigid internally toothed gears, i.e., the tooth width of both the first internal teeth and the second internal teeth, the tooth width L2 can be set to a width that satisfies the following conditional expression, in relation to the total tooth width L of the external teeth.

$$0.3L<L2<0.5L$$

Within the range in which this conditional expression is satisfied, the tooth width L2 should be made to decrease as the relieving length L1 increases, and made to increase as the relieving length L1 decreases.

In the flat strain wave gearing of the present invention, the distance between the support centers of the two rows of the wave bearings is made to increase as the relieving length L1 increases, as described above. Moreover, the relationships of the component dimensions are stipulated so that, along the tooth trace direction, the support center of the first wave bearing is brought nearer to the meshing center on the side of the first external tooth portion, and the support center of the second wave bearing is brought nearer to the meshing center on the side of the second external tooth portion.

The first external tooth portion and the second external tooth portion in the tooth trace direction, which are divided by the relieving portion, are thereby reliably supported in all locations in the tooth trace direction by the first and second wave bearings, respectively. Consequently, teeth contact in all tooth-trace-direction locations between the first external tooth portion and the first internal teeth, and teeth contact in all tooth-trace-direction locations between the second external tooth portion and the second internal teeth, can both be improved. The load distribution of rolling elements in the wave bearings of the wave generator can be evened out, and the maximum load on the wave bearings can be reduced.

As a result, according to the present invention, the root fatigue strength of the flexible externally toothed gear can be increased, and the transmitted-load capacity of the strain wave gearing can be increased. Furthermore, the life span of the wave bearings of the wave generator can be extended.

BRIEF DESCRIPTION OF THE DRAWINGS

FIGS. 1(a) and 1(b) includes an end face view and a longitudinal cross-sectional view showing a flat strain wave gearing to which the present invention has been applied.

MODE FOR CARRYING OUT THE INVENTION

Figure 2:
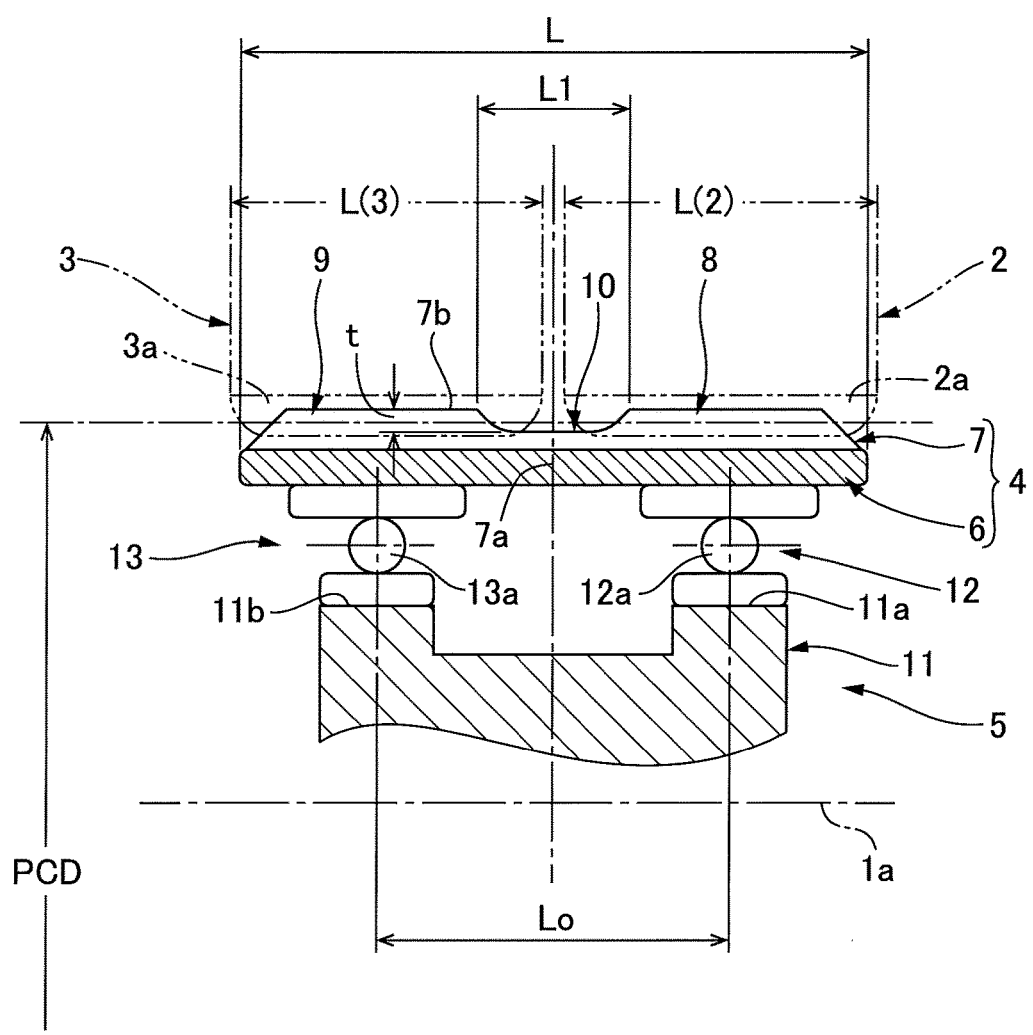
FIG. 2 is a schematic drawing showing the main parts of the flat strain wave gearing of FIGS. 1(a) and 1(b).

An embodiment of a flat strain wave gearing to which the present invention is applied is described below with reference to the drawings.

FIG. 1(a) is an end face view showing the flat strain wave gearing, and FIG. 1(b) is a longitudinal cross-sectional view showing the area sectioned along line b-b of FIG. 1(a). FIG. 2 is a schematic drawing showing a flexible externally toothed gear and a wave generator of the strain wave gearing. The flat strain wave gearing 1 (referred to below as the "strain wave gearing 1") is provided with an annular first rigid internally toothed gear 2, an annular second rigid internally toothed gear 3, a cylindrical flexible externally toothed gear 4 composed of a thin-walled elastic body capable of flexing in a radial direction, and an ellipsoidally contoured wave generator 5.

The first and second rigid internally toothed gears 2, 3 are coaxially disposed in parallel in the direction of a gearing center axis 1a, with a slight gap between the two gears. In the present example, the first rigid internally toothed gear 2 is a stationary-side internally toothed gear fixed so as to not rotate, and the number of first internal teeth 2a of this gear is Zc1. The second rigid internally toothed gear 3 is a drive-side internally toothed gear supported so as to be free to rotate, and the number of second internal teeth 3a of this gear is Zc2. The number Zc1 of first internal teeth 2a is 2n (n being a positive integer) greater than the number Zc2 of second internal teeth 3a. The second rigid internally toothed gear 3 is a reduced rotation output element of the strain wave gearing 1.

The cylindrical flexible externally toothed gear 4 is disposed coaxially on the inner sides of the first and second rigid internally toothed gears 2, 3. The flexible externally toothed gear 4 is provided with a cylindrical body 6 composed of a thin-walled elastic body capable of flexing in the radial direction, and external teeth 7 formed on the circular external peripheral surface of the cylindrical body 6. The external teeth 7 are capable of meshing with the first and second internal teeth 2a, 3a, and the number Zf of external teeth is the same as the number Zc2 of second internal teeth 3a on the drive side.

The external teeth 7 have a tooth width L that substantially encompasses the first and second internal teeth 2a, 3a. A first external tooth portion 8 that faces the first internal teeth 2a is formed in one tooth-trace-direction side of the external teeth 7, and a second external tooth portion 9 that faces the second internal teeth 3a is formed in the other side. The portion of the external teeth 7 between the first and second external tooth portions 8, 9 is a relieving portion 10.

The wave generator 5 is the rotation input element of the strain wave gearing 1. The wave generator 5 is provided with an ellipsoidally contoured rigid plug 11, and a first wave bearing 12 and second wave bearing 13 fitted on the ellipsoidal external peripheral surface of the rigid plug 11. The first and second wave bearings 12, 13 use ball bearings.

The wave generator 5 is fitted into the inner side of the cylindrical body 6 of the flexible externally toothed gear 4, making the flexible externally toothed gear 4 flex into an ellipsoidal shape. At both major-axis ends of the flexible externally toothed gear 4 made to flex into an ellipsoidal shape, the first external tooth portion 8 meshes with the first internal teeth 2a, and the second external tooth portion 9 meshes with the second internal teeth 3a. When the wave generator 5 is caused to rotate by a motor (not shown) or the like, the positions where the first and second rigid internally toothed gears 2, 3 and the flexible externally toothed gear 4 mesh move in the circumferential direction. Relative rotation, corresponding to the difference in the number of teeth, thereby occurs between the first rigid internally toothed gear 2 and the flexible externally toothed gear 4 which have different numbers of teeth. The other second rigid internally toothed gear 3, having the same number of teeth as the flexible externally toothed gear 4, rotates integrally with the flexible externally toothed gear 4, and reduced rotation is outputted from the second rigid internally toothed gear 3 to the load side (not shown).

(Relieving Portion)

The shape of the relieving portion 10 formed in the external teeth 7 will be described with reference primarily to FIG. 2.

First, the first external tooth portion 8 and the second external tooth portion 9 of the external teeth 7 face the first internal teeth 2a and the second internal teeth 3a, respectively. In the present example, the respective tooth widths L(2), L(3) of the first and second internal teeth 2a, 3a are essentially the same. With the tooth-trace-direction center position 7a of the external teeth 7 as a border, one side is the first external tooth portion 8, the other side is the second external tooth portion 9, and the first and second external tooth portions 8, 9 have the same tooth width. When the tooth widths L(2), L(3) of the first internal teeth 2a and the second internal teeth 3a differ from each other, the first external tooth portion 8 and the second external tooth portion 9 accordingly have different tooth widths as well.

The relieving portion 10 is formed by performing relieving on the tooth-trace-direction center portion of the external teeth 7. The length of the relieving portion 10 in the tooth trace direction is L1, and the center thereof coincides with the center position 7a of the external teeth 7. Relieving is performed in the relieving portion 10 so that the amount of relieving from the top land of the external tooth 7 reaches a maximum in the tooth-trace-direction center position 7a of the relieving portion 10. In the present example, relieving is performed so that the center position 7a has the deepest concave surface. Relieving can also be performed to create an inverted trapezoidal shape instead of a concave surface.

To be more specific, with L defined as the entire tooth width of the external teeth 7, the relieving length L1 of the relieving portion 10 in the tooth trace direction is set to a value that satisfies the following conditional expression.

$$0.1L < L1 < 0.5L$$

Taking PCD to be the pitch circle diameter of the non-deformed cylindrical external teeth 7, and t to be the maximum relieving amount in the tooth depth direction from the top land 7b of the external teeth 7 in the relieving portion 10, the maximum relieving amount t is set to a value that satisfies the following conditional expression.

$$3.3 \times 10^{-4} < t/PDC < 6.3 \times 10^{-4}$$

(Distance Between Ball Bearing Centers)

Next, FIG. 2 is referenced to describe the distance between the centers of the ball bearings (the distance between support centers) of the first and second wave bearings 12, 13.

On one side along the center axis direction in the rigid plug 11 of the wave generator 5, an ellipsoidally contoured first external peripheral surface 11a of fixed width is formed, and on the other side, an ellipsoidally contoured second external peripheral surface 11b of fixed width is formed. The first external peripheral surface 11a and the second external peripheral surface 11b are external peripheral surfaces having the same shape. The first wave bearing 12 is fitted on the first external peripheral surface 11a as having been made to flex into an ellipsoidal shape, and the second wave bearing 13 is fitted on the second external peripheral surface 11b as having been made to flex into an ellipsoidal shape. The first and second wave bearings 12, 13 are the same in the present example. When the first and second external tooth portions 8, 9 have different tooth widths, first and second wave bearings 12, 13 of different dimensions are used accordingly.

Bearing ball centers 12a, 13a of the first wave bearing 12 and the second wave bearing 13 are equidistant in the tooth trace direction from the tooth-trace-direction center position 7a of the external teeth 7. With Lo defined as the distance between ball bearing centers, the distance Lo between ball bearing centers increases and decreases as the relieving length L1 increases and decreases. The distance Lo between ball bearing centers is set to a value that satisfies the following conditional expression.

$$0.35L < Lo < 0.7L$$

(Relationship Between Distance Between Ball Bearing Centers and Relieving Length)

Next, because the first external tooth portion 8 is supported by the first wave bearing 12 and the second external tooth portion 9 is supported by the second wave bearing 13, the relieving portion 10 is positioned between the support centers of the first and second wave bearings 12, 13, along the tooth trace direction of the external teeth.

The relieving length L1 of the relieving portion 10 of the external teeth 7 is set to a value that satisfies the following conditional expression, in relation to the distance between the support centers of the first and second wave bearings 12, 13, i.e., the distance Lo between ball bearing centers.

$$0.3Lo < L1 < 0.7Lo$$

(Relationship Between Tooth Width of External Teeth and Tooth Width of Internal Teeth)

The first and second rigid internally toothed gears 2, 3 mesh with the first and second external tooth portions 8, 9, of which the tooth widths increase and decrease in accordance with the relieving length L1. Therefore, the tooth widths of the first and second rigid internally toothed gears 2, 3 also increase and decrease in accordance with the relieving length L1.

Specifically, taking the tooth width L2 to be the tooth widths of the first and second rigid internally toothed gears 2, 3, i.e., the respective tooth widths L(2), L(3) of the first and second internal teeth 2a, 3a, the tooth width L2 is set td a value that satisfies the following conditional expression, in relation to the total tooth width L of the external teeth 7.

$$0.3L < L2 < 0.5L$$

Within the range in which this conditional expression is satisfied, the tooth width L2 decreases when the relieving length L1 increases, and increases when the relieving length L1 decreases.

As described above, in the strain wave gearing 1 of the present example, relieving is performed on the tooth-trace-direction center portion of the external teeth 7. The concentration of stress in the tooth-trace-direction center portion of the external teeth 7 can thereby be mitigated, and torsional deformation of the external teeth 7 can be suppressed. As a result, a satisfactory state of meshing is maintained in individual tooth-trace-direction portions of the external teeth 7, the tooth face load can be equalized in all tooth-trace-direction portions of the external teeth 7, and the root fatigue strength of the external teeth 7 can be improved.

Because the distance Lo between ball bearing centers in the wave generator 5 is set as described above, the support rigidity can be increased in both the first external tooth portion 8 which meshes with the first internal teeth 2a and the second external tooth portion 9 which meshes with the second internal teeth 3a. A satisfactory state of meshing is thereby maintained in all tooth-trace-direction portions of the external teeth 7. Fluctuations in the bearing ball loads in the wave bearings 12, 13 of the wave generator 5 can be suppressed, and the maximum load on the wave bearings can be reduced.

Therefore, a strain wave gearing having a high transmitted-load capacity can be achieved, and the life span of the wave generator 5 can be extended.

The invention claimed is:

1. A flat strain wave gearing comprising:
   a first rigid internally toothed gear provided with first internal teeth having a first number of teeth;
   a second rigid internally toothed gear disposed adjacent to and coaxially with the first rigid internally toothed gear, and provided with second internal teeth having a second number of teeth different from the first number of teeth;
   a cylindrical, flexible externally toothed gear which is disposed coaxially with inner sides of the first and second rigid internally toothed gears, which is provided with external teeth capable of meshing with the first internal teeth and the second internal teeth, and which is capable of flexing in a radial direction; and
   a wave generator which is disposed on an inner side of the flexible externally toothed gear, and which makes the flexible externally toothed gear flex into a non-circular shape, causing the external teeth to partially mesh with the first and second internal teeth;
   wherein the external teeth are divided into a first external tooth portion that faces the first internal teeth, and a second external tooth portion that faces the second internal teeth, by a relieving portion, the relieving portion being formed in a portion of the external teeth located in a center portion along a tooth trace direction of the external teeth, and the relieving portion being formed through a predetermined length in the tooth trace direction;
   wherein the relieving portion is subjected to relieving so that a tooth depth thereof is lowest in a tooth-trace-direction center of the relieving portion;
   wherein the wave generator is provided with a first wave bearing for supporting the first external tooth portion and a second wave bearing for supporting the second external tooth portion;
   wherein a relieving length L1 of the relieving portion in the tooth trace direction satisfies a conditional expression $$0.1L < L1 < 0.5L$$

where L is a total tooth width of the external teeth; and
   wherein a maximum relieving amount t in a tooth depth direction from a top land of the external teeth in the relieving portion satisfies a conditional expression $$3.3 \times 10^{-4} < t/PCD < 6.3 \times 10^{-4}$$

where PCD is a pitch circle diameter of the external teeth.

2. The flat strain wave gearing according to claim 1, wherein, when Lo is a distance between support centers of the first and second wave bearings, the distance Lo between the support centers increases and decreases as the relieving length L1 increases and decreases; and the distance Lo between the support centers satisfies a following conditional expression:

$0.35L < Lo < 0.7L.$

3. The flat strain wave gearing according to claim 2, wherein, the relieving length L1 satisfies a following conditional expression, in relation to the distance Lo between the support centers:

$0.3Lo < L1 < 0.7Lo.$

4. The flat strain wave gearing according to claim 3, wherein, where a tooth width L2 is a tooth width of each of the first and second rigid internally toothed gears, the tooth width L2 satisfies a following conditional expression, in relation to the total tooth width L of the external teeth:

$0.3L < L2 < 0.5L;$ and wherein the tooth width L2 decreases as the relieving length L1 increases, and increases as the relieving length L1 decreases.

* * * * *